United States Patent [19]
Lang

[11] Patent Number: 5,954,361
[45] Date of Patent: Sep. 21, 1999

[54] GAS BAG

[75] Inventor: Norbert Lang, Leinzell, Germany

[73] Assignee: TRW Occupant Restraint Systems GmbH, Alfdorf, Germany

[21] Appl. No.: 09/013,446

[22] Filed: Jan. 26, 1998

[30] Foreign Application Priority Data

Jan. 29, 1997 [DE] Germany .................. 297 01 472 U

[51] Int. Cl.⁶ .................................................. B60R 21/20
[52] U.S. Cl. ..................................... 280/743.2; 280/743.1
[58] Field of Search ........................... 280/743.2, 743.1, 280/728.1

[56] References Cited

U.S. PATENT DOCUMENTS

| | | | |
|---|---|---|---|
| 5,205,584 | 4/1993 | Honda | 280/743.2 |
| 5,350,188 | 9/1994 | Sato | 280/739 |
| 5,358,273 | 10/1994 | Onishi et al. | 280/743.2 X |

FOREIGN PATENT DOCUMENTS

| | | |
|---|---|---|
| 4240277 | 6/1993 | Germany . |
| 52554 | 2/1989 | Japan .................. 280/743.2 |
| 74439 | 3/1990 | Japan .................. 280/743.2 |
| 310449 | 11/1992 | Japan .................. 280/743.2 |
| 2261855 | 6/1993 | United Kingdom . |

OTHER PUBLICATIONS

Research Disclosure #35070, Jun. 1993.
2244 Research Disclosure, 1996, Mar., No. 383, Emsworth, No. 38321 "Air Bag Tether". pp. 181–183.

*Primary Examiner*—Christopher P. Ellis
*Attorney, Agent, or Firm*—Tarolli, Sundheim, Covell, Tummino & Szabo

[57] ABSTRACT

A gas bag for a vehicle occupant restraint system has a wall, an inflation opening, a rim as part of the wall, surrounding the inflation opening, the gas bag being adapted to be secured to a gas generator housing in the region of the rim. The gas bag further has at least one limiting strap which is secured to the wall and has a reinforcement layer connected with the wall and at least partially covering the rim on the inner side of the gas bag. The reinforcement layer is exclusively formed by the limiting strap connected with the wall in the region of the rim.

14 Claims, 1 Drawing Sheet

GAS BAG

TECHNICAL FIELD

The invention relates to a gas bag for a vehicle occupant restraint system.

BACKGROUND OF THE INVENTION

In a gas bag which is known from GB-A-2 243 119 two limiting straps are provided which are connected with the wall of the bag by each of two ends of each strap in the region of the rim. The rim itself is additionally surrounded by a reinforcement layer which reduces the mechanical and also the thermal stress of the wall and of the limiting strap in the region around the inflation opening. With the inflation of hot gas, the rim is subjected to high thermal stresses, for which reason such reinforcement layers are usual.

BRIEF SUMMARY OF THE INVENTION

The invention provides a gas bag which requires less parts than the one known hitherto, whereby the manufacture is simplified. The gas bag according to the invention has a wall, an inflation opening, a rim as part of the wall, surrounding the inflation opening. The gas bag is adapted to be secured to a gas generator housing in the region of the rim. The gas bag further has at least one limiting strap which is secured to the wall and a reinforcement layer connected with the wall and at least partially covering the rim on the inner side of the gas bag. The reinforcement layer is exclusively formed by the limiting strap connected with the wall in the region of the rim.

In the gas bag according to the invention, a separate reinforcement layer is no longer provided, but rather the reinforcement layer is formed exclusively by the limiting strap which thereby has a dual function. Surprisingly, it was found that the hitherto usual separate reinforcement layers are superfluous, because the limiting strap alone can fulfil the tasks of a reinforcement layer without this having to excessively stress the gas bag mechanically or thermally.

According to the preferred embodiment, the limiting strap is connected with the wall by its ends at opposite regions of the rim and is connected with the wall by an intermediate section on a gas bag section lying substantially opposite the inflation opening, whereby a large region of the rim or even the entire rim is covered on the inner side by the limiting strap. Furthermore, several limiting straps can also be provided, the ends of which together cover the rim.

DETAILED DESCRIPTION OF THE PREFERRED EMBODIMENT

Figure 1:
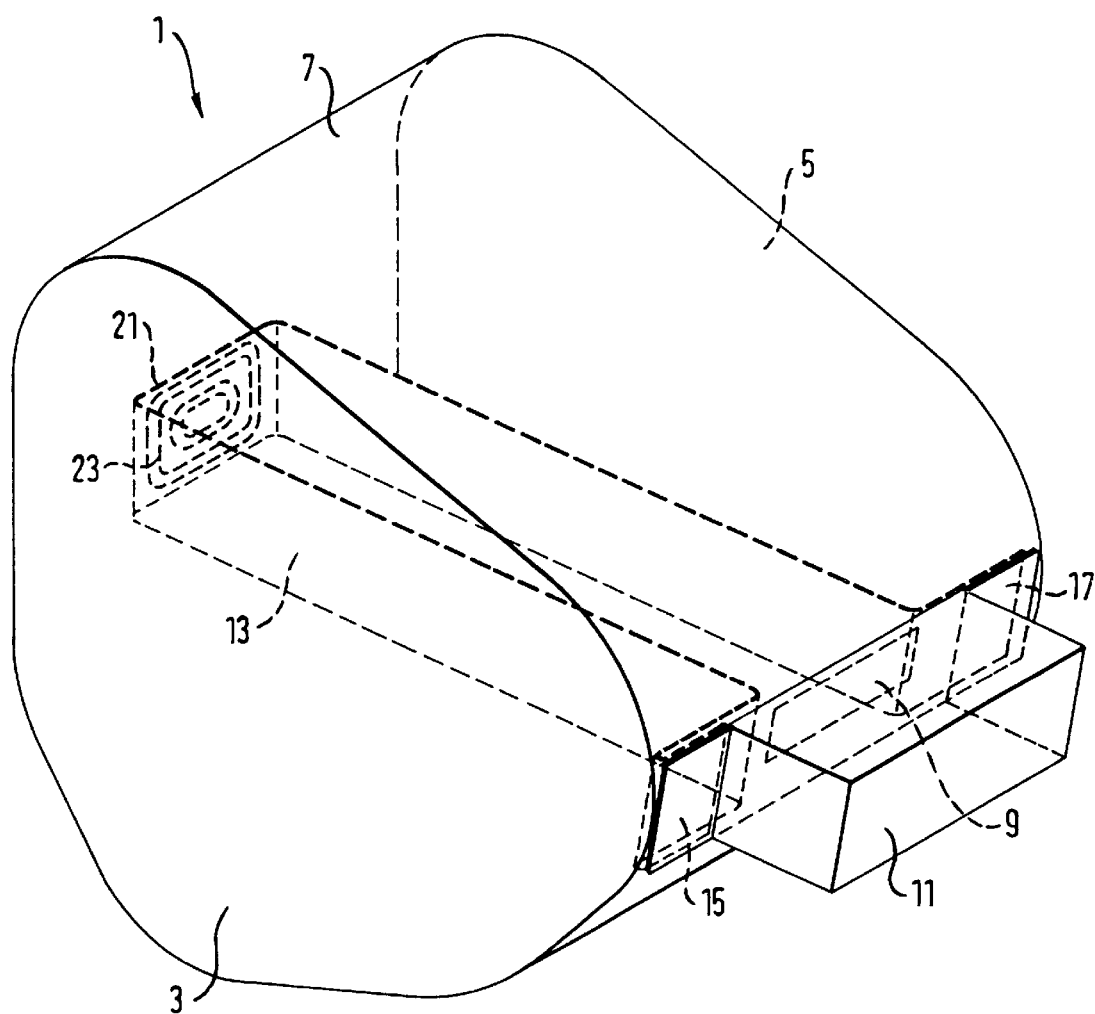
FIG. 1 shows a diagrammatic illustration of an embodiment of the gas bag according to the invention, in its inflated state.

A gas bag 1, shown in FIG. 1, comprises a wall which consists of two side parts 3, 5 and a covering part 7 connecting these. The wall has an inflation opening 9 which is surrounded by a rim as part of the wall. In the region of the rim surrounding the inflation opening 9, the gas bag 1 is secured to a gas Generator housing 11 in a conventional manner, which does not need to be explained in further detail. In the interior of the gas bag 1, a limiting strap 13 is provided, which co-determines the shape of the gas bag 1 in its inflated state. The elongated limiting strap 13 consists of the same gas bag fabric material as the wall.

The two ends 15, 17 of the limiting strap 13 are sewn with the wall at opposite regions, namely adjoining the short sides of the inflation opening 9. Thereby, the limiting strap 13 partially covers the rim of the inflation opening 9 and reduces the mechanical stress of the gas bag fabric in this region. In addition, the rim is also protected from too intense heat, which is brought about by the inflowing gas. The ends of the limiting strap 13 can be coated with a flame-resistant material.

In addition, it is possible to fold the ends of the limiting strap 13 to several layers, as is illustrated in FIG. 1 at the end 15.

On an intermediate section 21 of the limiting strap 13, this is connected by several seams 23 with a gas bag section lying substantially opposite the inflation opening 9.

As no separate reinforcement layers are provided, the number of parts to be sewn together during the production of the gas bag 1 can be kept low. In addition, the packing volume is reduced compared with conventional gas bags.

I claim:

1. A gas bag for a vehicle occupant restraint system, with a wall, an inflation opening, a rim as part of said wall surrounding said inflation opening, said gas bag being adapted to be secured to a gas generator housing in the region of said rim, with at least one limiting strap which is secured to said wall, and with a reinforcement layer connected with said wall and at least partially covering said rim on the inner side of said gas bag, said reinforcement layer being exclusively formed by said limiting strap connected with said wall in the region of said rim, said liming strap being a one-piece elongated strap having two opposite ends which are secured to said wall at opposite regions of said rim.

2. The gas bag according to claim 1, wherein said limiting strap consists of gas bag fabric material.

3. The gas bag according to claim 1, wherein said limiting strap is further connected with said wall by an intermediate section on a gas bag section lying substantially opposite said inflation opening.

4. The gas bag according to claim 1, wherein said gas bag is a passenger's gas bag and said inflation opening as a whole is substantially rectangular, and wherein said ends of said limiting strap are secured on rim sections adjacent to the shorter sides of said inflation opening.

5. The gas bag according to claim 3, wherein said ends of said limiting strap are folded to several layers and are sewn with said wall.

6. The gas bag according to claim 4, wherein two opposite side parts and a covering part connecting these parts are provided, said limiting strap being secured to said covering part.

7. A gas bag for a vehicle occupant restraint, with a wall, an inflation opening, a rim as part of said wall surrounding said inflation opening, said gas bag being adapted to be secured to a gas generator housing in the region of said rim, with at least one limiting strap which is secured to said wall, and with a reinforcement layer connected with said wall and at least partially covering said rim on the inner side of said gas bag, said reinforcement layer being exclusively formed by said limiting strap connected with said wall in the region of said rim, said limiting strap having two ends and being connected with said wall by said ends at opposite regions of said rim, and being connected with said wall by an intermediate section on a gas bag section lying substantially opposite said inflation opening, and said ends of said limiting strap being folded to several layers and being sewn with said wall.

8. The gas bag according to claim 7, wherein said limiting strap consists of gas bag fabric material.

9. The gas bag according to claim 7, wherein said gas bag is a passenger's gas bag and said inflation opening as a whole is substantially rectangular, and wherein said ends of said limiting strap are secured on rim sections adjacent to the shorter sides of said inflation opening.

10. The gas bag according to claim 9, wherein two opposite side parts and a covering part connecting these parts are provided, said limiting strap being secured to said covering part.

11. A passenger's gas bag for a vehicle occupant restraint system, with a wall comprising two opposite side parts and a covering part connecting said side parts, an inflation opening, a rim as part of said wall surrounding said inflation opening, said gas bag being adapted to be secured to a gas generator housing in the region of said rim, with at least one limiting strap, and with a reinforcement layer connected with said wall and at least partially covering said rim on the inner side of said gas bag, said reinforcement layer being exclusively formed by said limiting strap, said inflation opening as a whole being substantially rectangular, and said limiting strap being secured to said covering part by said ends of said limiting strap being secured on rim sections adjacent to shorter sides of said inflation opening.

12. The gas bag according to claim 11, wherein said limiting strap consists of gas bag fabric material.

13. The gas bag according to claim 11, wherein said limiting strap is further connected with said wall by an intermediate section on a gas bag section lying substantially opposite said inflation opening.

14. The gas bag according to claim 11, wherein said ends of said limiting strap are folded to several layers and are sewn with said wall.

* * * * *